United States Patent [19]

Trenkamp

[11] 4,025,760

[45] May 24, 1977

[54] SECURITY MEANS FOR TRANSACTION TERMINAL SYSTEM

[75] Inventor: Robert H. Trenkamp, Cleveland Heights, Ohio

[73] Assignee: Addressograph Multigraph Corporation, Cleveland, Ohio

[22] Filed: Aug. 14, 1975

[21] Appl. No.: 601,947

[52] U.S. Cl. .................. 235/61.7 B; 235/151; 340/149 A; 356/71

[51] Int. Cl.² .................. G06F 15/20; G06K 9/08; G06K 7/00; H04Q 2/54

[58] Field of Search .............. 340/149 A, 150, 151, 340/152 R, 172.5; 235/61.7 B, 61.11 E, 61.11 D, 151; 194/4; 179/2 CA, 6.3 CC; 356/71; 346/42

[56] References Cited

UNITED STATES PATENTS

| | | | |
|---|---|---|---|
| 3,513,298 | 5/1970 | Riddle | 235/61.11 D |
| 3,593,008 | 7/1971 | De Witt | 235/151 |
| 3,611,293 | 10/1971 | Constable | 340/149 A |
| 3,612,687 | 10/1971 | Cook | 356/71 |
| 3,648,243 | 3/1972 | Wiggins | 340/152 |
| 3,665,162 | 5/1972 | Yamamoto | 235/61.7 B |
| 3,846,622 | 11/1974 | Meyer | 235/61.7 B |
| 3,956,615 | 5/1976 | Anderson | 235/61.7 B |

*Primary Examiner*—Robert M. Kilgore
*Attorney, Agent, or Firm*—Harry M. Fleck, Jr.

[57] ABSTRACT

A transaction terminal system is provided including means which prevent the utilization of certain tapped-line data. Security data, such as personal identification numbers or card security codes, is allowed to be distorted by each terminal in a manner which varies from terminal to terminal within the system and is corrected for at the data processor or other appropriate location in a manner specified for the particular terminal sending the data.

11 Claims, 8 Drawing Figures

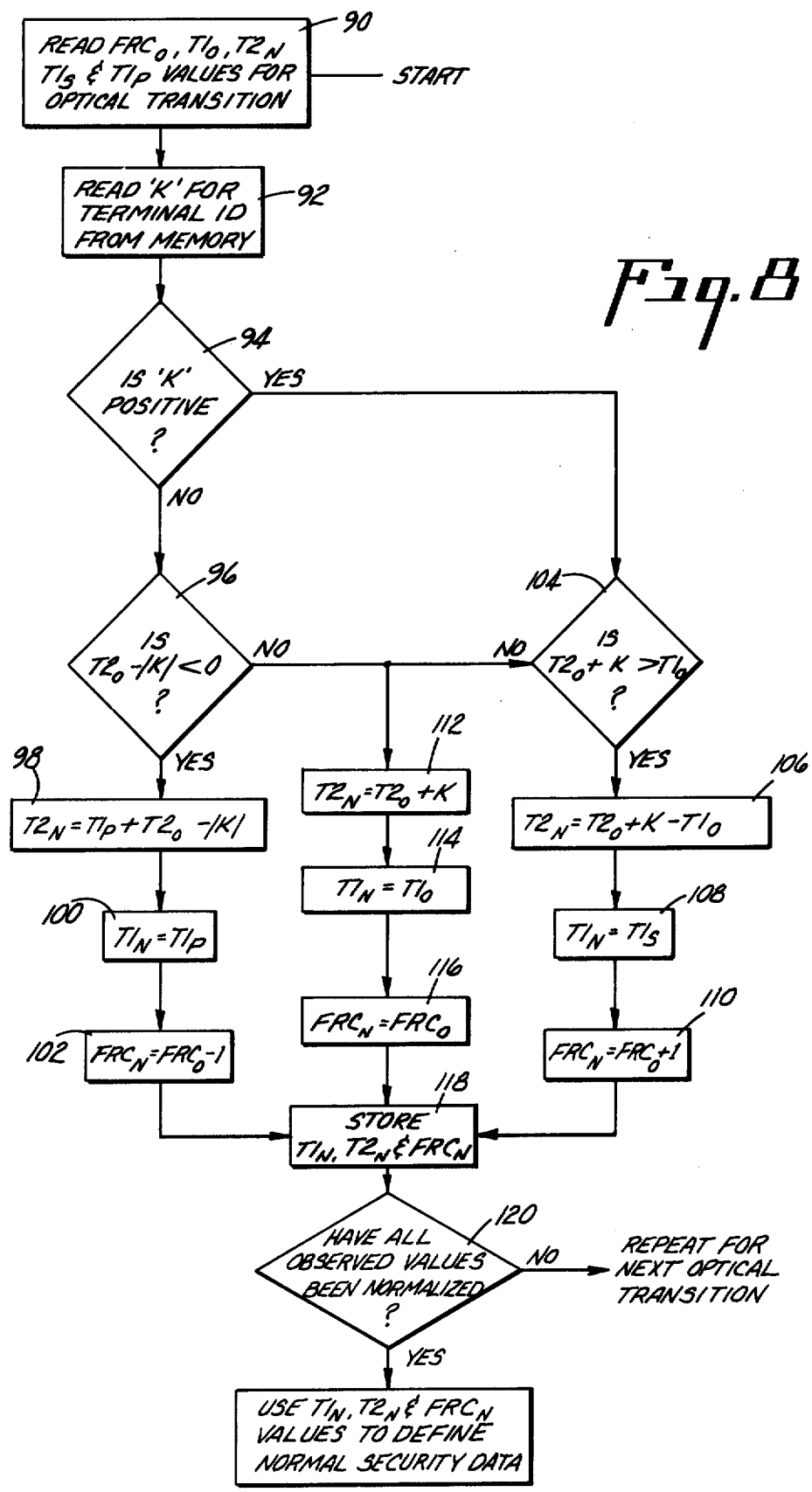

SECURITY MEANS FOR TRANSACTION TERMINAL SYSTEM

BACKGROUND OF THE INVENTION

The present invention is generally related to credit card transaction systems and, more particularly, to an improved transaction terminal system and method for enhancing system security.

In recent years, transaction terminals and systems have increased in popularity and are now utilized for credit card transactions, check cashing authorization, and electronic funds transfer. With the increasing use of terminals for transaction involving large sums of money, system security has become an item of increased concern. In an effort to improve security, the use of personal identification numbers (PIN's) and card security features (CSF) has been proposed. Systems which utilize PIN's require that the card holder key-in the proper PIN before the transaction will be approved. Generally, each account number is assigned a PIN which is stored in memory. After the PIN is keyed-in by the account holder, the memory is accessed and a comparison is made between the keyed PIN and the stored PIN or a number derived algorithmically from the stored number. Conversely, a number arrived at algorithmically from the entered PIN may be compared with the stored or derived number. If the numbers do not compare, the system refuses the transaction.

Card security features are utilized to prevent fraud through the use of counterfeit or altered credit cards. Most recently, it has been proposed to provide a card security feature which would include optical data elements, in addition to magnetic data, whereby the pair of data sets may be utilized to determine the authenticity of the card. Such a security feature is disclosed in copending U.S. patent application Ser. No. 381,351, filed May 27, 1975 in the name of Francis C. Foote and assigned to the assignee of the present invention. Briefly, this security feature entails the use of a security code or the like which is defined at least in part by the spacial relationship between the optical and magnetic data elements on the card. After encoding, each card is assigned a corresponding security code which is recorded at a CPU, validation module, or other appropriate location, for subsequent comparison. with a code generated when a card is presented and read by a remote terminal. A favorable comparison within predetermined limits that the card is authentic, while the absence of the comparison indicates that the card is counterfeit or has been altered.

In order to produce a counterfeit or duplicate card containing such a security feature, it is necessary to reproduce both data sets as well as the spacial relationship therebetween. This, of course, cannot be achieved by "magnetic skimming" or similar methods and would require considerable time and expense, as well as the use of sophisticated equipment to produce merely a single counterfeit card. Of course, it is foreseeable that if the reward is great enough, criminal elements will take such efforts to produce a counterfeit card or cards which may be used fraudulently through terminals in a transaction system.

It is possible that a criminal element may obtain security data, either in the form of a card security feature or PIN, by "tapping" the telecommunications line connecting a terminal to a system. When such a tap is successfully made, the PIN used or the observation made on the card security feature may be recorded along with other data pertinent to the transaction. From this data, one could conceivably produce (at a considerable expense) a counterfeit card and use such fradulently at any terminal within the system. It is also conceivable that PIN's obtained by tapping might be utilized fraudulently together with conventional credit cards which are simpler to counterfeit.

It has been proposed that encryption algorithms and the like be utilized to defeat the gathering of data by a telecommunication tap. However, skillful electronics technicians could technicians tap into many terminals at a point prior to the encryption and thereby render the encryption useless as a security measure. It is also important to note that security information (such as PIN or CSF) which is gained through a telecommunications tap is useful in the perpetration of fraud at any terminal within the system. Thus, the collusion or deception which allowed a tap to occur in the first place cannot be readily identified with any one particular terminal from analyzing statistical fraud data. This could present an acute problem with respect to the interchange environment expected in the near future under banking and funds transfer applications, since cards provided by one of many issuers may be used in electronic terminals owned by other issuers. Thus, laxity on the part of one issuer or institution may compromise the security of another.

Accordingly, there is a definite need for a transaction system which provides improved security and, more particularly, which prevents the wrongful gathering of security data such as PIN's or card security features by terminal telecommunications taps.

SUMMARY OF THE INVENTION

The present invention comprises a means and method for preventing the usage of tapped line security data by distorting the data within each terminal as it is generated and in a manner which varies from terminal to terminal within the system. A correction factor is applied to the distorted data at a CPU or other location to "normalize" the data or otherwise restore it to a meaningful condition. Preferably, the correction factors are stored in memory and accessed through terminal identification data which is transmitted by each terminal together with the security data. Each terminal, or group of terminals within the system has a different correction factor stored in memory. Thus, if the correction factor is known for one terminal, such will not jeopardize the security of other terminals within the system. Card security data may be distorted by the card reader or associated circuitry, while PNP data may be distorted by the entry keyboard encoder. Since such data is distorted at the point of generation, it is not possible to make a tap internal to the terminal to obtain undistorted data, as may be possible with the "encryption" solution to the data security problem.

It is an object of the present invention to provide a novel means for enhancing the overall security of a transaction terminal system.

Another object of the present invention is to provide a unique method and means for preventing the use of security data obtained illegally through tapping terminal telecommunication lines.

It is a further object of the present invention to provide a versatile, yet relatively simple and inexpensive, means for enhancing terminal system security by disorting security data generated at a terminal in a manner which varies from terminal to terminal within the system and applying a correction factor at a CPU or other location which restores the data to a meaningful condition.

Still a further object of the present invention is to provide a novel means for enhancing the overall security of a transaction terminal system by distorting PIN data at the keyboard of each terminal in a manner which differs from terminal to terminal, such that the tapped line information relative to the PIN will be meaningless.

It is yet another object of the present invention to provide a versatile security enhancement means including means for distorting card security data at the card reader or associated circuitry of each terminal in manner which differs from terminal to terminal, such that tapped line information relative to the card security data will be meaningless.

BRIEF DESCRIPTION OF THE DRAWINGS

FIG. 8 is a flow chart illustrating a procedure for applying a correction factor to the security data provided by the circuitry illustrated in FIG. 7.

DETAILED DESCRIPTION OF THE INVENTION

Figure 1:
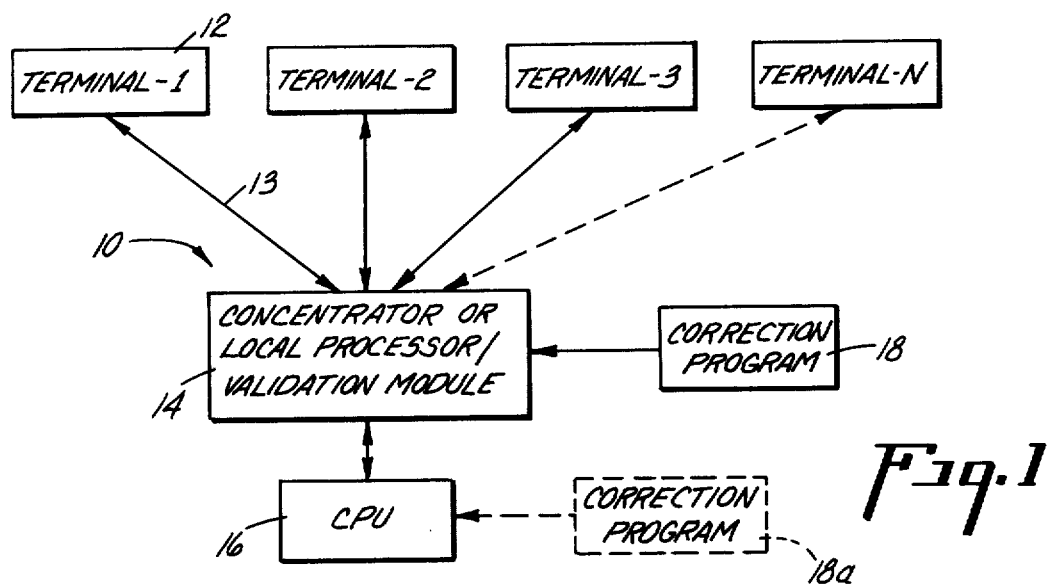
FIG. 1 is a simplified block diagram of a typical transaction terminal system utilizing the security means of the present invention.
Figure 2:
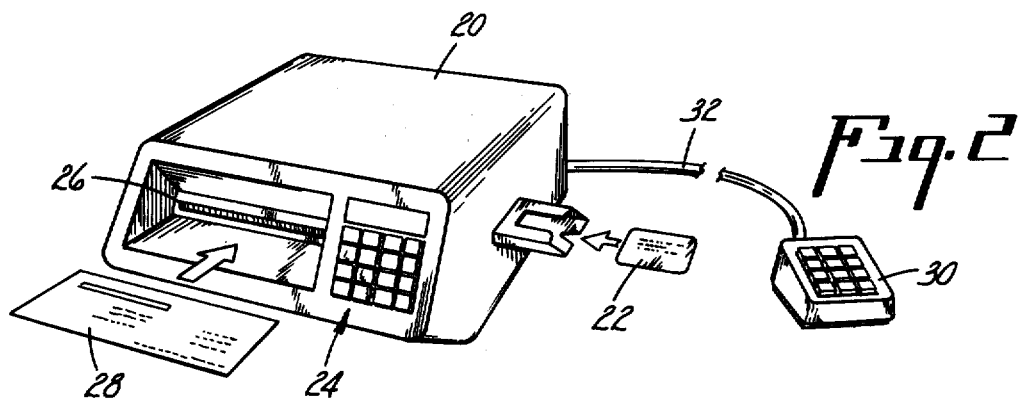
FIG. 2 is a perspective view of a transaction terminal associated with the security system of the present invention.

Referring now, more particularly, to FIGS. 1 and 2 of the drawings, the block diagram illustrating the transaction terminal system of the present invention is generally indicated by the numeral 10 and includes a plurality of remote data capture terminals 12 connected by communication lines 13, or other appropriate means, to a concentrator or data processor 14. Depending upon the requirements of the system, the concentrator 14 may be connected via telecommunication lines to a central processing unit (CPU) 16. Various types of telecommunication lines and associated equipment, such as modems, are well known to those skilled in the art and it is not intended that such constitute a portion of the present invention. Each terminal 12 includes means for generating security related data, which may take the form of card security data and/or personal identification data. As mentioned above, the security data, or portion thereof, is allowed to be distorted at each terminal in a manner which varies from terminal to terminal within the system. When the data is received at the concentrator or local data processor 14, a correction factor is applied by an appropriate program indicated by block 18. Alternately, this correction factor may be applied at the CPU, as indicated by block 18a.

Various types of data capture terminals may be utilized with the system of the present invention, so long as such include means for generating card security data and/or personal identification number data. A typical terminal is indicated by the numeral 20 in FIG. 2 and includes means for receiving a credit card 22. Data contained on the card, such as the security data and account indentification data is generated by an appropriate reader within the terminal. A keyboard 24 is provided for entering the amount of the transaction and other appropriate data. Each terminal also includes means for generating terminal identification data, which is sent together with the other data to the concentrator and/or CPU. The terminal illustrated is also provided with a slot 26 for receiving a form set 28, or the like, which is automatically imprinted upon approval of the transaction by the system. A data capture terminal with such capabilities is described in detail in copending U.S. patent application Ser. No. 373,777, assigned to the assignee of the present invention.

It will be appreciated that the terminal illustrated in FIG. 2 is provided with an auxiliary keypad 30 connected to the terminal proper through a cable 32. Generally, this keypad is connected to the encoding circuitry associated with entry keyboard 24 and is intended for the entry of personal identification number data by the account holder who presents his card to the terminal operator. Preferably, keypad 30 is somewhat remote from terminal 20 or is positioned such that the terminal operator or others may not observe entry of the personal identification number by the account holder. It is foreseeable that appropriate shielding means may be provided to assure the needed degree of secrecy. It should be noted, of course, that the system of the present invention, as hereinafter described, does not necessarily require the use of an auxiliary keypad as illustrated in FIG. 2. The enhanced system security may be provided through the use of distorted card security data, hereinafter described, without the need for distorting the personal identification data. Of course, it is foreseeable that both or either type of security data may be distorted and subsequently corrected in accordance with the present invention.

Figure 3:
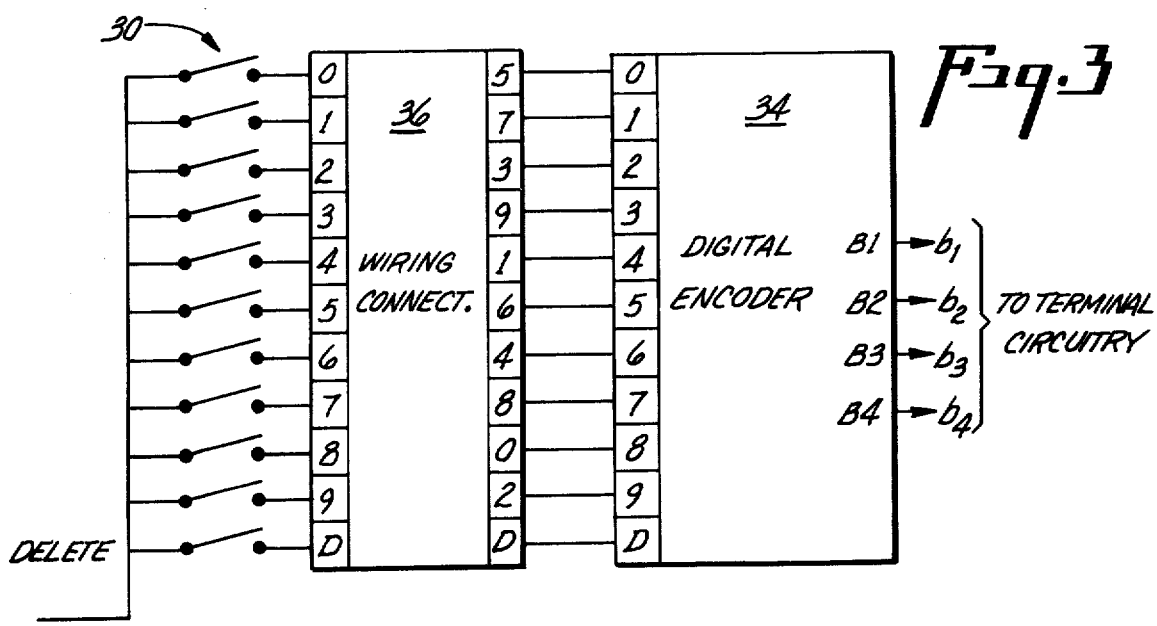
FIG. 3 is a block diagram of the keyboard entry circuitry associated with the present invention.

As mentioned above, conventional transaction terminal systems are susceptible to fraud in that they allow security data, such as personal identification data, to be wrongfully gathered via a telecommunications line tap. FIG. 3 is a block diagram of a circuitry which may be utilized to distort the personal identification data at each terminal in a manner which varies from terminal to terminal within the system and such that the data gathered via the telecommunications line tap would be substantially meaningless. Keypad 30 contains 12 operative keys including numeric keys 0–9 end key and a delete key. In general, actuation of a key causes one character of data in the form of an eight-bit data train to be entered into the terminal memory and subsequently placed on the telecommunication line. The 12 keys are illustrated in simplified form in FIG. 3 as normally open switches. Each of the switches is connected to a binary "1" signal source. The delete switch, when closed, results in a special code being generated which is placed into memory. The end switch, when closed, returns control to the terminal. The remaining switches, when closed, respectively apply binary 1 signals to a digital encoder 34. Preferably, the encoder circuit is a conventional type, such as a diode matrix or the line. The output from the encoder is provided by output lines B1, B2, B3 and B4 which respectively provide data bits $b_1$, $b_2$, $b_3$ and $b_4$. The encoder may be provided with additional outputs, if desired, such as those described in the above-referenced terminal patent application.

It will be appreciated that the keypad 30 is connected to the input of digital encoder 34 through a wiring terminal block 36. During the manufacturing process, these connections are intentionally varied from terminal to terminal between the keypad and digital encoder, such that the encoder outputs do not necessarily correspond to the specific keypad selections. For example, operation of the key labelled "1" may generate digital data corresponding to the number "4". Thus, the security data outputted by the terminal differs significantly from the keypad in by the account holder at keypad 30. This may be achieved by varying the wiring connections randomly, or randomly within the limits. By keying in data at the factory and recording the resultant outputs, a correction table or correction factor may be arrived at for each terminal. This correction information is recorded as a function of the terminal identification, preferably in the form of a memory look-up table, for subsequent use in the system at the concentrator, CPU, or other location. It will be appreciated that since the wiring connections or other distortion means vary from terminal to terminal within the system, knowledge of the correction factor or table for any one terminal will not jeopardize the other terminals within the system. Thus, the overall system security is significantly enhanced.

Figure 4:
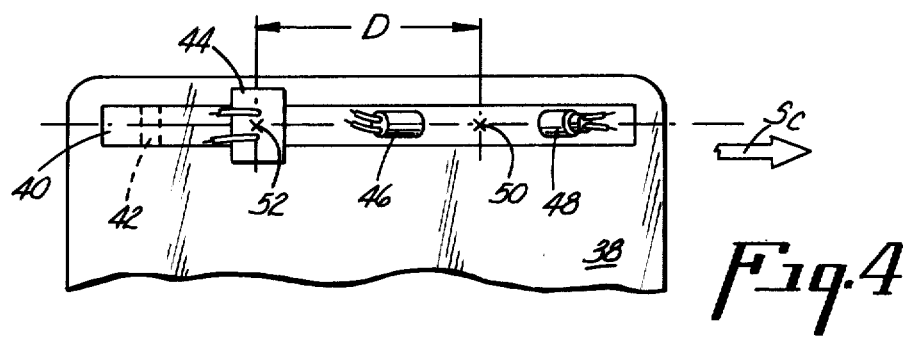
FIG. 4 is a partial plan view of a magnetic/optical reader associated with the present invention.
Figure 5:
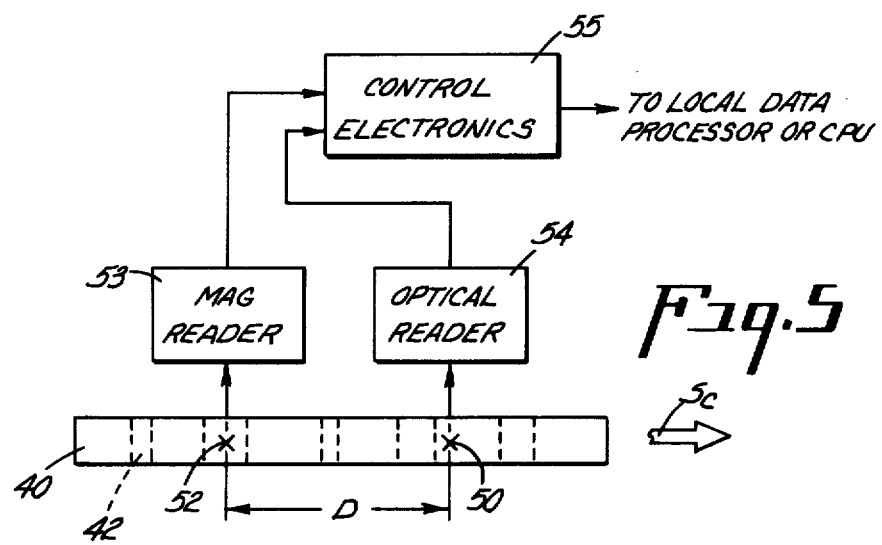
FIG. 5 is a block diagram of the circuitry of the magnetic/optical reader illustrated in FIG. 4.
Figure 6:
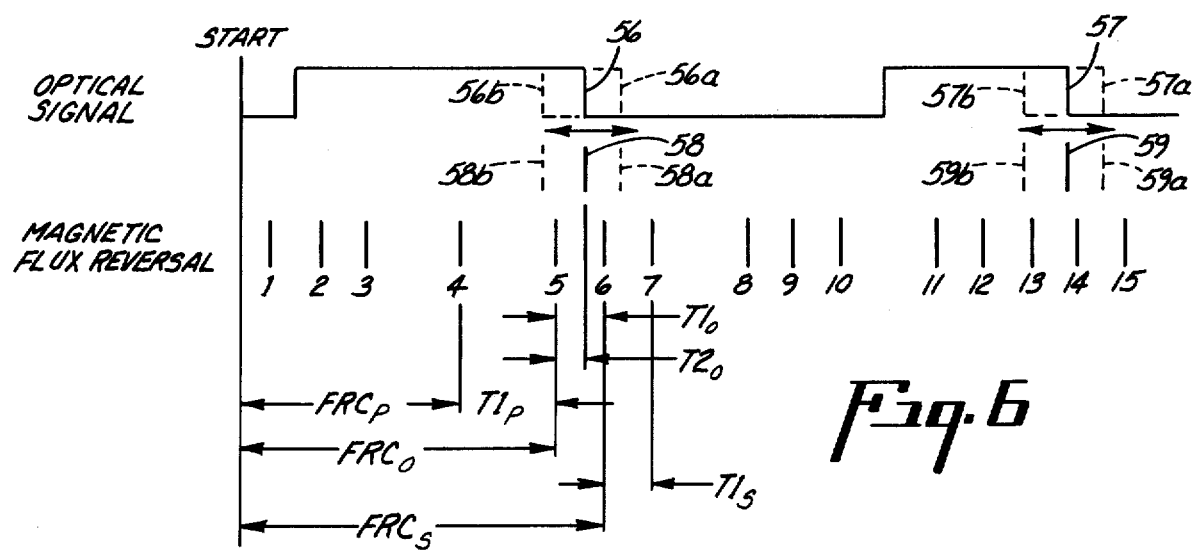
FIG. 6 is a timing diagram illustrating the relationship between the optical and magnetic data sets generated by the reader of FIG. 4.

This system security is achieved for card security data, as well as personal identification data described above. Such card security data is disclosed in above-referenced copending U.S. patent application Ser. No. 381,351. With reference to FIGS. 4-6, the security enhancement may be more fully understood. A typical credit card structure indicated by numeral 38 includes an elongated data area 40 containing at least one magnetic data track and a plurality of underlying reflective elements 42. A magnetic read head 44 is provided for sensing data from the magnetic stripe and may be of conventional construction, capable of reading single or multiple tracks of magnetic data from area 40. Reflective elements 42, as described in the above-referenced U.S. patent application Ser. No. 381,351, may be defined by metallic areas which are vapor deposited beneath the magnetic media such that they are concealed against detection with visible radiation. Once the card has been encoded, there is a fixed spacial relationship between the magnetic data elements (flux reversals) and the edges of the optical elements. This spacial relationship is utilized to define security data for the particular card. In order to produce another card which will provide the same security data, upon reading, it is necessary to duplicate both the magnetic and optical data pattern and fix such in the proper spacial relationship within a card structure. The high degree of difficulty in successfully accomplishing this task significantly reduces the likelihood of counterfeit cards being placed into circulation without detection by the system.

The presence of the reflective elements beneath the magnetic stripe is detected through the use of infrared radiation (or other appropriate radiation) from a source 46. Preferably, source 46 provides a beam of radiation which is focussed by appropriate optical means, such as lenses, optical slits, mirrors and the like. The nature of the particular magnetic medium is such that it is substantially transparent to the infrared radiation. If the incident beam of radiation, which penetrates magnetic medium strikes a reflective element, a substantial portion of the radiation is reflected to an infrared detector 48 which generates corresponding electrical output signals. An appropriate transport means, not illustrated, provides relative movement between the read heads and card as indicated by arrows $S_c$. As the card is passed beneath the magnetic and optical read heads, the resultant signals therefrom are previously by appropriate citcuitry such as hereinafter described.

It will be appreciated that radiation from source 46 intersects the underlying reflective elements in a small area or location indicated by numeral 50. This is the effective reading aperture or location for the optical read head. Magnetic read head 44 includes an air gap, or magnetic reluctance aperture (not illustrated), which is generally less than 5 mils in width. The effective reading location for the magnetic head lies at approximately mid-position of this aperture and such is indicated by numeral 52 in FIGS. 4 and 5. The distance or spacing separating the effective magnetic and optical read locations is indicated by the dimension D. As mentioned above, the card security data is defined at least in part by the spacial relationship between the optical and magnetic data elements. The system observes the locations of the leading and/or trailing edges of at least some of the optical elements and relative positions to the flux reversals from one of the magnetic tracks. The existence or non-existence of the spacial relationship is determined ultimately from the signals generated by the optical and magnetic read head.

The time or spacial relationship between these signals will be dependent upon the distance or spacing D between effective read locations 50 and 52. If this dimension is changed, the spacial relationship will change accordingly. In the system of the present invention, dimension D is varied from terminal to terminal within the system such that the spacial relationship and card security data varies or is distorted from terminal. Thus, security data obtained by tapping the telecommunications line of a terminal will be meaningless without knowledge of the distortion factor. The system, on the other hand, is capable of utilizing such distorted security data through the application of a correction factor or program at the concentrator, local data processor or CPU.

This will be more apparent with reference to FIG. 5. The circuitry associated with the magnetic and optical readers is indicated by blocks 53 and 54. Such includes, in addition to the read heads described above, appropriate circuitry for processing the output signals and provide the digital equivalent. Such may also include means for filtering out noise picked up either by the optical or magnetic read heads. Time delay circuits may be provided, if desired, for either or both the magnetic and optical readers to effect a relative time or spacial shift between the resultant output signals. Such time delays are well known to those skilled in the art and a detailed description of such is felt to be unneccessary for the purposes of this application. It is foreseeable that the time delay circuit may be used alone, or in combination with a variation of dimension D to achieve distortion of the security data in a manner which varies from terminal to terminal within the system. The resultant data signals from readers 53 and 54 are fed to appropriate control circuitry 55, hereinafter described with reference to FIG. 7.

Referring, more particularly, to FIG. 6, a portion of a typical optical signal pattern is illustrated and includes a pair of trailing edges 56 and 57 corresponding to the second edges of the reflective elements and resulting in digital data signals of 58 and 59, respectively. The magnetic data is defined by a plurality of flux reversals which are numbered consecutively 1-15. In the preferred embodiment, the magnetic flux reversals are spaced apart by a distance of approximately 6.67 mils. (for a 1 bit) or 13.33 mils. (for a 0 bit). If the security words such as hereinafter described are utilized, the system observes the leading or trailing optical edges. For the purposes of this description, it will be assumed that the system observes the trailing edges and corresponding digital data signals, such as indicated at 58 and 59. The location of each edge signal relative to the magnetic flux reversal is expressed in terms of a flux reversal count (FRC) plus a fraction of the flux reversal time interval expressed in terms of T1 and T2. Each flux reversal time interval is divided by high frequency clock pulses by the circuitry hereinafter described. This assures a high degree of accuracy in pinpointing the exact location of the observed trailing edge relative to the flux reversals. $T1_0$ denotes the number of clock counts corresponding to a flux reversal time interval during which an optical edge is detected. In FIG. 6, this is illustrated as the time interval between flux reversal counts 5 and 6. $T2_0$ denotes the number of clock counts corresponding to the separation between flux reversal 5 and the location of optical edge 58. As illustrated in FIG. 6, $T1_p$ corresponds to the clock count between previous flux reversals 4 and 5, while $T1_s$ corresponds to the clock count between subsequent flux reversals 6 and 7. The observed flux reversal count, in this case count 5, is denoted by $FRC_0$. The previous flux reversal count (count 4) is labelled $FRC_p$. The subsequent flux reversal count (count 6) is indicated as $FRC_r$.

It will be appreciated that the optical signal pattern is shifted in time and space relative to the flux reversals as a function of dimension D and any time delays which may be provided in the reader circuitry. For example, if dimension D were to be decreased, the optical signal pattern would be shifted to the right to provide trailing edges shown in dash line at 56a and 57a. This would result in the optical data bits being shifted to positions indicated at 58a and 59a. Under these conditions, the readers would observe edge data 58a as occurring between flux reversal counts 6 and 7, rather than 5 and 6. An increase of dimension D will have the effect of shifting the optical signal pattern and resultant edge data to the left, such that edge data 58b would be observed as occurring between flux reversals 4 and 5, rather than 5 and 6. It will be appreciated that such a distortion of the security data renders such meaningless if obtained by way of a telecommunications line tap without knowledge of the distortion or corresponding correction factors.

Figure 7:
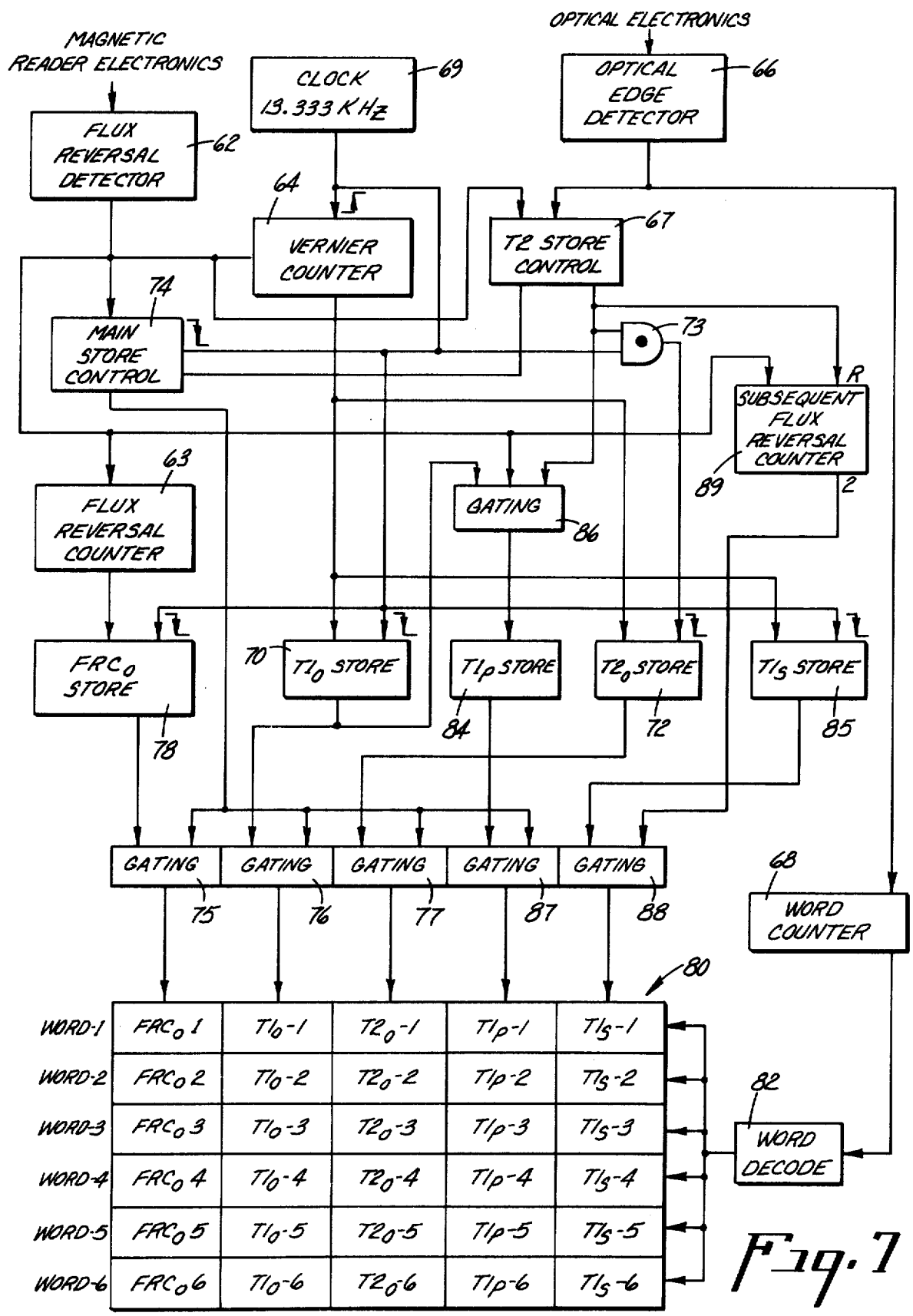
FIG. 7 is a block diagram of a typical circuit which may be utilized to gather and store card security data.

Referring to FIG. 7, circuitry which may be utilized for gathering and storing card security data at each terminal may be more fully understood. This circuitry observes the optical and magnetic data from a card as it is read and stores data definitive of the security feature, preferably in the form of six security words. The circuitry is provided with a flux reversal detector 62, the output of which is fed to a flux reversal counter 63 and is used to reset a binary vernier counter 64. The output of an optical edge detector 66 is used to enable a T2 store control 67 at the mid-point of each optical trailing edge. Signals from detector 66 are also use to advance a word counter 68 each time a trailing edge is detected.

Timing is provided by an oscillator 69 which generates clock pulses signals $\phi$, preferably of 13.333 KHZ. Under appropriate conditions, this advances a vernier counter 64, the output of which is fed to a $T1_0$ count storage buffer 70 under control of the falling edges of the $\phi$ clock pulses. The output of count 64 is also loaded into a $T2_0$ count storage buffer 72 under control of the T2 store control 67, which enables gage 73 to pass $\phi$ clock pulses, the falling edges of which cause loading of the $T2_0$ count into buffer 72. A second output of the T2 store control also conditions a Main Store Control 74 to operate gating circuit 75, 76 and 77 when the next flux reversal is detected. The flux reversal count of counter 63 is fed to a storage buffer 78 under control of the falling edges of the $\phi$ clock pulses.

The counts stored at 70 and 72 are used to record the $T1_0$ and $T2_0$ values observed by the terminal for each word, while the count stored at 78 is used to record the observed flux reversal count for each word. A matrix of storage registers, or other memory means, generally indicated by the numeral 80 provides for storage of the flux reversal counts (FRC), as well as the $T1_0$, $T2_0$, $T1_p$ and $T1_s$ counts. In the example illustrated, registers are provided for the storage of six validation words. Of course, a greater or lesser number may be utilized depending upon the system requirements. There are a total of 30 registers, or an equivalent memory structure such as a layered buffer. The observed flux reversal count of buffer 78 is entered into the appropriate $FRC_0$ register through gating means 75. The $T1_0$ and $T2_0$ counts are entered through appropriate gating means 76 and 77, respectively. The registers to be loaded are selective under control of a word decoder 82 connected to the output of word counter 68.

Basic operation of the circuitry is initiated upon detection of specific flux reversals which are not necessarily the first flux reversals. Preferably, a specific "start" code is written on one of the data tracks. After this code has been read, the first output pulse from detector 62 is effective to reset vernier counter 64 and advance the flux reversal counter 63. Vernier counter 64 is incremented by rising edges of the $\phi$ clock pulses. The count of counter 64 is loaded into buffers 70 and 72 at the falling edge of each $\phi$ clock pulse. The flux reversal count of counter 63 is similarly loaded into buffer 78. When the first optical trailing edge is sensed, the output of detector 66 advances word counter 68 to the first count, whereby the output of decoder 82 selects the appropriate storage location for the first Validation Word (in this case $FRC_0$-1, $T1_0$-1, $T2_0$-1). Also, control 67 is enabled thereby conditioning control 74 and disabling gate 73. This terminates advance of the $T2_0$ count stored at buffer 72. The $T1_0$ count stored at 70 continues to be incremented until the next flux reversal is sensed through detector 62. This causes control 74 to enable gates 75, 76 and 77 at the next rising edge of a $\phi$ pulses, whereby the counts stored in buffers 78, 70 and 72 are loaded into the proper storage locations in matrix 80. The pulse from detector 62 is also effective to reset vernier counter 64 and reset control 67 to condition such to wait for the next optical edge. In addition, the flux reversal counter 63 is advanced to the next count.

The enhanced security of the system is achieved by allowing the card security data to be distorted, within limits, as described above. It is foreseeable that the selected distortion limits may be such that observed optical transitions may be shifted, upon correction, to the previous or subsequent flux reversal time intervals. These intervals are labelled as $T1_p$ (previous) and $T1_s$ (subsequent) in FIG. 6. Such being the case, it is necessary to record values for $T1_p$ and $T1_s$, in the event that they are required for correction purposes. The necessity for storing such is dependent upon the distortion limits selected for the system. For example, if a large distortion range covering several flux reversal time intervals were to be selected, it would be necessary to store several subsequent and previous T1 count values. Of course, it is not intended that the present invention be limited to the requirements of storing $T1_s$ and $T1_p$, as it is foreseeable that the system may lend itself to obtaining such information by analysis of the magnetic data system itself at the correction factor point, in which event the circuitry illustrated in FIG. 8 would not be required for each terminal.

If the circuitry of FIG. 7 is utilized, the $T1_p$ and $T1_s$ count values are stored by buffers 84 and 85, respectively. The $T1_0$ count stored in buffer 70 is loaded into buffer 84 through a gate 86 if an optical edge has not been detected during the previous T1 flux reversal interval. Gate 86 is provided with two control inputs, one of which is connected to the output of T2 store control 67 and the other one of which is connected to the output of flux reversal detector 62. The output of the T2 store control remains high in the absence of an optical edge being detected. This conditions gate 86 to pass the $T1_0$ count to buffer 84 upon detection of the next flux reversal by detector 62. In reality, the transfer of this data to buffer 84 would entail multiple output lines from the $T1_0$ storage buffer 70, thus, requiring multiple gates.

Once the $T1_p$ count has been stored in buffer 84 it remains there until the next flux reversal is detected, at which time it is either loaded into memory matrix 80 through gate 87 or replaced by the $T1_0$ count of buffer 70. If an optical edge has been detected during $T1_0$, the $T1_p$ count is shifted to matrix 80, together with the $T1_0$ and $T1_2$ counts of buffers 70 and 72, under control of the main store control 74. Of course, if no optical edge is detected, $T1_p$ is replaced with the previous $T1_0$ count, but no data is loaded into memory matrix 80.

Buffer 85 is connected in parallel with buffer 70 and is utilized to store a $T1_s$ count representative of the flux reversal time interval subsequent to the detection of an optical edge. The count stored in register 85 reflects the condition of vernier counter 64 which is reset to zero upon detection of each flux reversal. The $T1_s$ count of buffer 85 is passed to storage matrix 80 through a gating circuit 88, which is enabled by a flux reversal counter 89. When an optical edge is detected, a transition in the output of the T2 store control 67 is effective to reset counter 89. Flux reversals subsequently detected through detector 62 increment counter 89 until a "2" count is reached. Counter 89 then enables gating circuit 88, wherey the $T1_s$ count from storage buffer 85 is shifted to the appropriate location in matrix 80.

It will be appreciated that if no optical edge is detected after detection of a flux reversal (which is often the case), T2 store control 67 will not be enabled to condition the main store control 74 for operation of gating circuits 75, 76 and 77. Thus, none of the counts stored in buffers 70, 72, 78 and 84 will be stored as part of a validation word unless an optical edge has been detected. On the other hand, if an optical edge has been detected, Main Store Control 74 is conditioned for operation of gating circuits 75, 76, 77 and 87 when the next flux reversal is detected; such is synchronized with the rising edge of a $\phi$ clock pulse.

When the card is encoded by the application of reflectors in a random manner, the possibility exists that the trailing edge of the first reflector will be coincident in time with a flux reversal. Slight variations in spacing between the magnetic and optical read heads could also cause one terminal to sense such a transition while another would miss the transition. In order to prevent this from occurring, the card encoder may be provided with an IR sensor and associated circuitry to detect an incipient placement of the start code within a predetermined tolerance of the first optical trailing edge prior to writing any magnetic information, and to adjust the placement of the magnetic information within necessary tolerances, such as specified by ANSI X4.16-1973.

In accordance with the present invention, a correction factor or constant K is provided for each terminal within the system. Preferably, this constant is a digital representation of the time distortion between the magnetic and optical signals due to the variations described above. The constant for a terminal may be determined by reading a standard card or document with the terminal's reader and analyzing the resultant output data to determine the spacial shift from some predetermined reference (not necessarily zero). This spacial shift is expressed in terms of clock pulse units to arrive at the constant K. The clock pulse units are the same as those used to provide the T1 and T2 count values. The constant is then stored in memory at the concentrator, CPU, or other appropriate point in the system and is subsequently accessed in accordance with the terminal identification data which is tranmitted together with the security data when processing a transaction through the terminal.

FIG. 8 is a flow chart of a typical program which may be utilized to correct or normalize the observed data such that it is meaningful to the system and can be utilized to determine the authenticity of the presented card. The above-described security words which are comprised of observed data are read from a memory accessible by the program. This operation is indicated by block 90. The program then obtains the correction constant K stored in memory for the particular terminal, as indicated by block 92. Depending upon the terminal, K may be either positive or negative in nature, and such is determined by the program as indicated by decision block 92. A determination is then made to whether the observed optical transition, when normalized, should have occurred within the previous or subsequent flux reversal time intervals. For example, if K is a negative and $T2_0 - |K| < 0$, then the observed transition should be shifted to the previous time interval corresponding to $T1_p$. On the other hand, if $T2_0 - |K| < 0$, normalization of the data does not require that the optical transition be shifted to the previous flux reversal time interval. This decision is indicated by block 96. If it should occur that $T2_0 = |K|$, the program may be tailored to treat the optical transition as occurring within the observed flux reversal time interval $T1_0$.

If it is determined that $T2_0 - |K| < 0$, then it follows that the normalized or corrected value ($T2_n$) for the T2 count will be equal to $T1_p + T2_0 - |K|$, as indicated by the equation in block 98. It also follows that the T1 count when normalized ($T1_n$) will be equal to $T1_p$, which is the previous flux reversal time interval count. This is indicated by block 100. Also, it follows that the flux reversal count ($FRC_0$) should be decreased by 1. This is indicated by equation $FRC_n = FRC_0 - 1$ illustrated in block 102.

Returning to decision block 94, it will be appreciated that the value for K may be positive in which event the program determines whether $T2_0 + K > T1_0$, as indicated by block 104. In other words, should the observed transition be shifted to the subsequent flux reversal time interval corresponding to $T1_s$. If it is determined that $T2_0 + K > T1_0$, then T2 count is normalized in accordance with the equation $T2_n + T2_0 + K - T1_0$ shown by block 106. It follows that $T1_n$ (the normalized T1 count) will be equal to $T1_s$ as indicated by block 108. It also follows that $FRC_n = FRC_0 + 1$ as shown in block 110.

If the program determines that $T2_0 - |K|$ is not less that 0 or $T2_0 + K$ is not greater than $T1_0$, then the observed optical transition should be shifted to the previous or subsequent flux reversal time interval period. Under these conditions, it follows that $T2_n = T2_0$ K as indicated by block 112. It also follows, as indicated by block 114, that $T1_n = T1_0$ and it is apparent that $FRC_n = FRC_0$ as shown at 116.

The normalized values $T1_n$, $T2_n$, and $FRC_n$ are then stored in memory to define out of the security data words. This operation is symbolized by block 118. The program determines if all security word values have been normalized (block 120). If they have not, the above-described routine is repeated for the remaining observed security data. When all pertinent values for $T_10$, $T_20$ and $FRC_0$ have been normalized, such are compared with values previously recorded for the particular credit card. If these values do not agree within predetermined limits set for the system, the card will be rejected by the system as being non-authentic, or of questionable authenticity.

It is not intended that the enhanced security system of the present invention be limited to card security data or personal identification data. As will be apparent to those skilled in the art, the system may be modified to provide enhanced security with respect to the handling of other types of data over telecommunication lines. It will also be appreciated that the card security may be defined by data other than that associated with one optical set and one magnetic data set. For example, it is foreseeable that the security data may be defined by data from more than two data sets, or that plural optical or plural magnetic data sets may be provided for defining the card security data. These, and other modifications as will be apparent to those skilled in the art, are deemed to fall within the scope of the present invention.

Since the foregoing description and drawings are merely illustrative, the scope of protection of the invention has been more broadly stated in the following claims and these should be liberally interpreted so as to obtain the benefit of all equivalents which the invention fairly entitled.

I claim:

1. A transaction terminal system comprising: data processing means,
   a plurality of remote data capture terminals, each said terminal including:
      data input means for receiving data including account identification data and associated security data, each said data input means including means for distorting said security data such that the distortions vary among said terminals for the same said received security data,
      said data input means including means for reading security data from a document whereby the validity determination is representative of the authenticity of the presented document,
      means for generating terminal identification data,
      means for transmitting said terminal identification data, account identification data, and distorted security data to said data processing means,
   said data processing means including:
      means for correcting said distorted security data in a predetermined manner specified for said terminal, and
      means for determining the validity of said corrected security data.
   said document security data including data from at least two data sets, said reading means including means for reading said data from said data sets and providing output signals representative thereof, said distortion means defining at least in part the effective time or spacial relationship between said output signals from a said terminal.

2. The transaction terminal system set forth in claim 1 wherein said relationship varies generally from terminal to terminal within the system whereby said distortion means varies generally from terminal to terminal.

3. The transaction terminal system set forth in claim 2 wherein said relationship varies randomly within limits from terminal to terminal.

4. The transaction terminal system set forth in claim 2 wherein said correction means is defined at least in part by correction data stored at said processing means and accessable in accordance with said terminal identification data and being representative of said relationship provided by the associated terminal.

5. The transaction terminal system set forth in claim 4 wherein said reading means includes at least two data readers for said data sets respectively and each having an effective reading location, said relationship being defined at least in part by the relative positions of said reaching locations within the associated terminal.

6. The transaction terminal system set forth in claim 5 wherein said relative positions of said reading locations vary from terminal to terminal whereby said distortion means varies from terminal to terminal.

7. The transaction terminal system set forth in claim 6 wherein said positions of said reading locations vary randomly within limits from terminal to terminal.

8. The transaction terminal system set forth in claim 2 wherein said distortion means includes timing means at each terminal for altering the time relationship between said output signals.

9. A method of enhancing the security of a transaction terminal system including a data processing station and plurality of terminals, each terminal having means for reading data from a pair of data sets carried by a presented document and generating signals representative of the data, said method comprising:
   varying characteristics of the reading means from terminal to terminal within the system whereby the time or spacial relationship between the resultant signals varies from terminal to terminal, determining the reading means characteristics for each terminal and storing data representative thereof at the data processing station, and utilizing the stored data for the terminals to normalize the time or spacial relationship between the data set data subsequently read by a terminal in the system.

10. The method set forth in claim 9 wherein said reading means include a reader for each of said pair of data sets and said step of varying characteristics includes the step of varying the timing relationship between the signals from the readers in a manner which varies from terminal to terminal within the system.

11. The method set forth in claim 10 wherein the step of varying the characteristics includes varying the spacial relationship between said pair of readers to effect a corresponding time relationship variations between the data sets read from a document.

* * * * *